Feb. 28, 1928.
O. KURZ
BRACELET FOR RODS AND THE LIKE
Filed Jan. 15, 1927
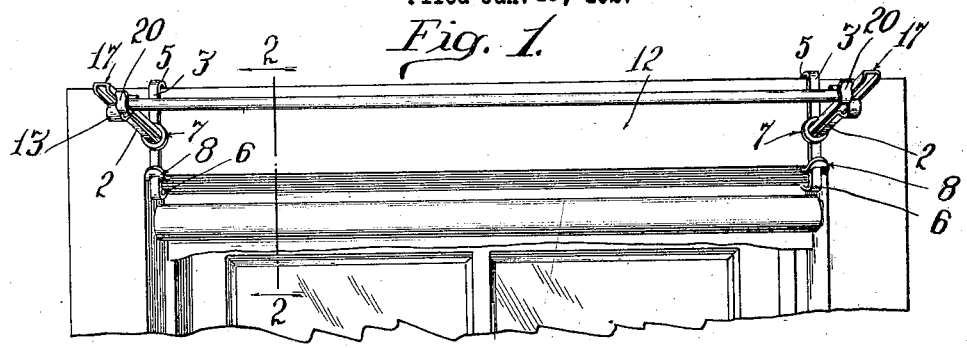
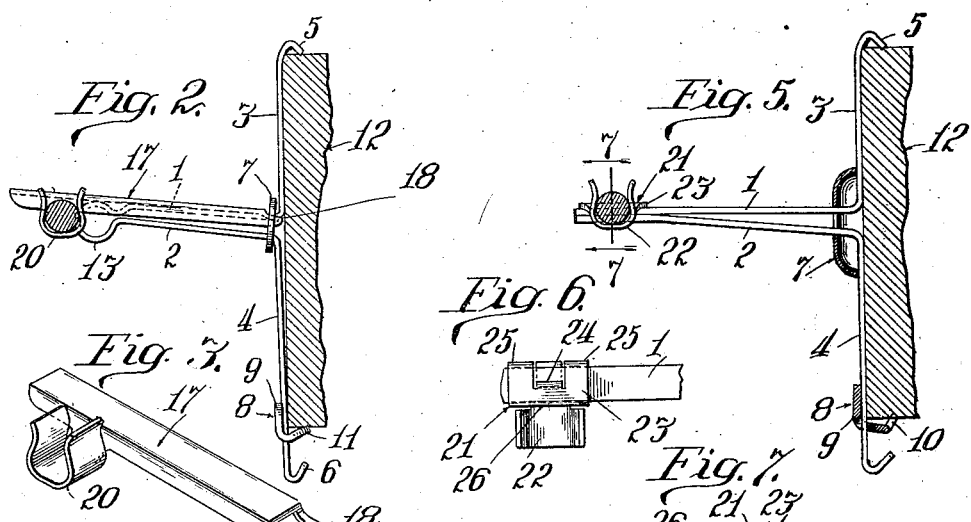
Inventor
Otto Kurz
By Rudolph ...
Attorney Patented Feb. 28, 1928.

1,660,795

UNITED STATES PATENT OFFICE.

OTTO KURZ, OF CHICAGO, ILLINOIS.

BRACKET FOR RODS AND THE LIKE.

Application filed January 15, 1927. Serial No. 161,274.

This invention has for its object to provide a supporting bracket for curtain rods or other drapery suspension devices, or for supporting from a window casing or from a moulding strip or part of the trim of a room, such as a bathroom, any desired devices or fixtures, the particular object of the invention being to provide a supporting device or bracket which can be easily and quickly mounted when desired, without the use of nails or screws and without defacing the face portion of the casing, moulding or other trim.

A further object of the invention is to provide a device of the character aforesaid which is very neat, strong and can be very cheaply produced.

Suitable embodiments of the invention are illustrated in the accompanying drawings, wherein:

Fig. 1 is a fragmentary view in elevation of the upper portion of a window casing equipped with supporting brackets constructed in accordance with the invention, the said brackets being shown in perspective.

Fig. 2 is a section on the line 2—2 of Fig. 1.

Fig. 3 is a detail perspective view of a part of the structure shown in Figs. 1 and 2.

Fig. 4 is a perspective view of a toggle-clutch member employed.

Fig. 5 is a view similar to Fig. 2 showing a modified form of construction, or different embodiment of the invention.

Fig. 6 is a fragmentary plan view of the outer end portion of the device shown in Fig. 5.

Fig. 7 is a sectional view on the line 7—7 of Fig. 5.

Fig. 8 is a perspective view of another type of toggle clutch employed.

Fig. 9 is a side elevation of another embodiment of the invention.

Fig. 10 is a sectional view on the line 10—10 of Fig. 9.

The invention consists mainly in providing a bracket member which includes a projecting portion which, at its outer or free end may be equipped with various devices for attaching thereto devices to be supported thereby and which also includes a base portion which is adjustable so that it may be easily engaged with the top and bottom surfaces of a horizontally disposed moulding strip or trim.

Thus, each of the devices shown in Figs. 1, 2, 5 and 9 comprises two arms 1 and 2 which may be integral or coupled with each other at their outer or free ends, but each of which is provided at its inner end with an arm or base portion, 3 and 4, respectively, which terminate in the sharp, opposed projections, 5 and 6, respectively, the free ends of which are adapted to engage in the top and bottom surface portions, respectively, of a moulding strip or the like. The length of the respective arms 3 and 4 is such as, when said arms are spaced from each other a normal distance, will cause the free ends of the projections 5 and 6 to be spaced apart a distance substantially equal to the width of the widest moulding strip generally encountered in a residential structure. The device is made of sheet steel so that the same is sufficiently flexible for the purposes of this invention and to force the ends of the projections 5 and 6 into the wood, of which the trim of a building is usually made, there is mounted on the arms 1 and 2 a ring or equivalent device 7 having an opening therein of smaller diameter than the normal distance between the top surface of the arm 1 and the bottom surface of the arm 2, said ring 7 or the like being forced toward the base portions 3 and 4 to effect contraction of the space between the inner end portions of the arms 1 and 2 and a consequent movement toward each other of the base portions 3 and 4 and projections 5 and 6.

One of the base portions 3 and 4, preferably the latter, is equipped with a removable toggle-clutch member 8, which consists of a steel disk having an opening therein presenting sharp corners adapted to bite into the surfaces of the base portion 4 in a well-known manner when canted relatively to said base portion, the said opening being slightly wider than the thickness of said base portion 4. The disk 8 is preferably bent between its ends on a line parallel with one of the edges of the opening therein adapted to bite into a surface of the base portion 4 to provide an outer flange 9 which lies fairly closely proximate to the outer surface of the base portion 4 when in use. This toggle-clutch member 8 may be moved to any desired position on the said base portion 4 and may, as shown in Fig. 8, be provided with sharp prongs 10, or, as shown in Fig. 4, be provided only with a sharp rounded edge 11 to dig into the wood, said prongs 10 or sharp edge 11 being opposed to the projection 5. Thus, if, as shown in Figs. 1, 2 and 5, the wood element 12 is of less width than the projections 5 and 6 may engage when moved toward each other the maximum distance permitted by the member 7, one of said clutch elements 8 is mounted on the base portion 4 and moved into contact with the lower edge of the element 12, while the member 7 is disposed in a position on the arms 1 and 2 spaced from the base portions 3 and 4 and said member 7 is then moved toward the latter and thus causes the member 8 to firmly engage the base portion 4 and its sharp edge portion 10 or 11, as the case may be, to bite into the element 12. The supporting device is thus firmly secured to the element 12.

The outer or free end portions of the arms 1 and 2 may be integral with each other, as shown in Figs. 1, 2 and 9, and, as shown in Fig. 9 may be bent to form a loop 13 for the passage of the shank of a machine screw 14 which may engage in a threaded opening in the end of a rod 15, a cap member or ferrule 16 for the end of the rod being also provided.

In Figs. 1, 2 and 3, I have shown a channeled member 17 which snugly receives the arm 1 and is provided with an end wall 18 having an opening 19 therein through which said arm 1 passes. Said member 17 is equipped at one side with a U-shaped projection 20 in which an end portion of a curtain rod may rest. Said member 17 may be engaged by the member 7 to hold it against longitudinal movement on the arm 1 and may be positioned and so held as to vary the spacing of the projection 20 from the element 12.

Figs. 5, 6 and 7 show the arms 1 and 2 as separate from, instead of integral with each other, and a member 21 coupling the free end portions thereof, said member 21 including a projection 22 corresponding to the projection 20 of Figs. 1, 2 and 3. Said member 21 includes the plate or flange 23 out of which there is struck a downwardly extending tongue 24 which is passed through slots in the outer end portions of the said arms 1 and 2 and being over at lower end for clinching purposes, as shown, the said plate or flange 23 resting upon the top face of the arm 1 and having also the lips or projections 25 which coact with the end wall 26 of the member 22 to prevent rocking movement of the said device relatively to said arms 1 and 2. This said device last described is so made as to be capable of being interchangeably used upon either the right or left hand bracket member.

Obviously, the free end portions of the arms 1 and 2 may be variously equipped to suit special purposes for which the bracket members are to be adapted, the purpose of illustrating a few examples of such equipment being merely to indicate the probable extent of utility of the bracket members per se.

The arms 1 and 2 may be defined as constituting a substantially V-shaped member, and the base portions 3 and 4 as flanges of said arms 1 and 2.

In the event that the moulding strip 12 is of greater width than the distance spanning of the sharp projections 5 and 6, the lower of said projections may be driven into the wood by a hammer blow and by then moving the ring 7 toward the inner ends of the arms 1 and 2, the sharp projections 5 will be caused to engage in the upper edge of the strip 12. As the load supported by the bracket tends to force the lower projection 6 toward the strip 12 and places an opposite stress upon the projection 5, it will be obvious that the expedient of driving the projection 6 into the wood is very practical.

While I have shown the arms 1 and 2 arranged and equipped to support a rod or the like, it will be very obvious that said arms may be variously shaped and relatively arranged for any desired load suspension purpose.

I claim as my invention:

1. A bracket for rods and the like including a substantially V-shaped member provided at the divergent ends of its arms with oppositely extending flanges, at least one of which is equipped at its free end with a hook-like projection having a sharp edge, a toggle-clutch member slidable on the other of said flanges for adjustment thereon and having a sharp edge portion opposed to the sharp edge of the projection of the other member for co-operation therewith to engage an interposed element, and a member slidably mounted on said V-shaped member for effecting convergent movement of said projection and clutch-member for forcing and holding the sharp edges thereof engaged with an interposed element.

2. A bracket for rods and the like including a substantially V-shaped member provided at the divergent ends of its arms with oppositely extending flanges, at least one of which is equipped at its free end with a hook-like projection having a sharp edge, a toggle-clutch member slidable on the other of said flanges for adjustment thereon and having a sharp edge portion opposed to the sharp edge of the projection of the other member for co-operation therewith to engage an interposed element, and a member slidably mounted on said V-shaped member for effecting convergent movement of said projection and clutch-member for forcing and holding the sharp edges thereof engaged with an interposed element, and means at the other or apex end of said V-shaped member for engaging an end portion of a rod.

3. A bracket for rods and the like including a substantially V-shaped member provided at the divergent ends of its arms with oppositely extending flanges, at least one of which is equipped at its free end with a hook-like projection having a sharp edge, a toggle-clutch member slidable on the other of said flanges for adjustment thereon and having a sharp edge portion opposed to the sharp edge of the projection of the other member for co-operation therewith to engage an interposed element, and a member slidably mounted on said V-shaped member for effecting convergent movement of said projection and clutch-member for forcing and holding the sharp edges thereof engaged with an interposed element, and a member adjustably mounted on one of the arms of said V-shaped member and engaged by said slidable member and thereby held against movement as said slidable member is positioned to hold said sharp-edged projection and clutch-member engaged with an interposed element.

OTTO KURZ.